(12) United States Patent
Archer

(10) Patent No.: US 6,747,955 B1
(45) Date of Patent: Jun. 8, 2004

(54) METHOD AND SYSTEM FOR CONGESTION CONTROL IN A TELECOMMUNICATIONS NETWORK

(75) Inventor: Jarrett E. Archer, Celeste, TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/191,324

(22) Filed: Nov. 13, 1998

(51) Int. Cl.[7] ............................................. G01R 31/08
(52) U.S. Cl. ...................... 370/236; 370/229; 370/235
(58) Field of Search ................... 370/229, 230, 370/231, 232, 235, 236, 230.1, 233, 234, 237, 236.1, 352, 353, 354, 355, 357, 358, 360, 386; 379/14, 12, 15.01, 15.02, 15.04, 32.01, 32.03

(56) References Cited

U.S. PATENT DOCUMENTS 5,694,390 A * 12/1997 Yamato et al. .............. 370/230
5,867,570 A *  2/1999 Bargout et al. ........ 379/221.13
6,094,418 A *  7/2000 Soumiya et al. ............ 370/231
6,111,854 A *  8/2000 Mukaino .................... 370/229

OTHER PUBLICATIONS

American National Standards Institute, "American National Standard for Telecommunications—Signalling System No. 7 (SS7)—Transaction Capabilities Application Part (TCAP)," ANSI TI.114, 1996.
Bellcore, Switching System Generic Requirements for Call Control Using the Integrated Services Digital Network User Part (ISDNUP), Generic Requirements GR–317–CORE, Revision 3, Nov. 1996.

* cited by examiner

Primary Examiner—Phirin Sam
(74) Attorney, Agent, or Firm—Craig A. Hoersten; V. Lawrence Sewell

(57) ABSTRACT

Congestion control is provided in a first telecommunications element by receiving a congestion state for a second telecommunications element coupled to the first telecommunications element. An internal congestion state is set in the first telecommunications element for the second telecommunications element based on the congestion state. The internal congestion state for the second telecommunications element is maintained in the first telecommunications element independently of receiving a disparate congestion state for the second telecommunications element.

14 Claims, 2 Drawing Sheets

METHOD AND SYSTEM FOR CONGESTION CONTROL IN A TELECOMMUNICATIONS NETWORK

TECHNICAL FIELD OF THE INVENTION

This invention relates generally to the field of telecommunications, and more particularly to an improved method and system for congestion control in a telecommunications network.

BACKGROUND OF THE INVENTION

Advanced telecommunications systems include a number of switching points interconnected by communication links. Control points are connected to the switching points by separate messaging links and route messages between the switching points on the messaging links. Such messages are used to set up, monitor, and break down calls across the switching points. In routing messages between switching points, the control points detect congestion on the messaging links and notifies the switching points of the congestion states. The switching points then adjust call processing based on the congestion states.

Due to the size and number of switching points and other elements in many telecommunications networks and the nature of network traffic, congestion states often rapidly change or cycle between one or more levels. As a result, the control points are continuously detecting and transmitting new congestion states to the switching points, which are constantly altering call processing based on the changing congestion states. This ties up valuable network resources and can lead to call processing becoming confused in the network.

SUMMARY OF THE INVENTION

The present invention provides a method and system for congestion and control in a telecommunications network that substantially reduce or eliminate disadvantages and problems associated with prior systems and methods. In particular, the present invention maintains congestion states for a set period of time in order to reduce congestion state hysteresis and call processing confusion.

In accordance with one embodiment of the present invention, congestion control is provided in a first telecommunications element by receiving a congestion state for a second telecommunications element coupled to the first telecommunications element. An internal congestion state is set in the first telecommunications element for the second telecommunications element based on the congestion state. The internal congestion state for the second telecommunications element is maintained in the first telecommunications element independently of receiving a disparate congestion state for the second communications element.

More particularly, in accordance with a particular embodiment of the present invention, the first telecommunications element is a switch and the second telecommunications element is a link disposed between the switch and the second switch. The internal congestion state is independently maintained in the switch by maintaining the internal congestion state for a predefined period of time. Congestion control is implemented in the switch for communications with the second switch based on the internal congestion state.

Technical advantages of the present invention include providing an improved method and system for congestion control in a telecommunications network. In particular, congestion states for network elements are held for set periods of time in order to reduce congestion state hysteresis and resulting call processing confusion.

Other technical advantages will be readily apparent to one skilled in the art from the following figures, description, and claims.

BRIEF DESCRIPTION OF THE DRAWINGS

For a more complete understanding of the present invention and its advantages, reference is now made to the following brief description, taken in conjunction with the accompanying drawings and detailed description, wherein like reference numerals represent like parts, in which.

DETAILED DESCRIPTION OF THE INVENTION

Figure 1:
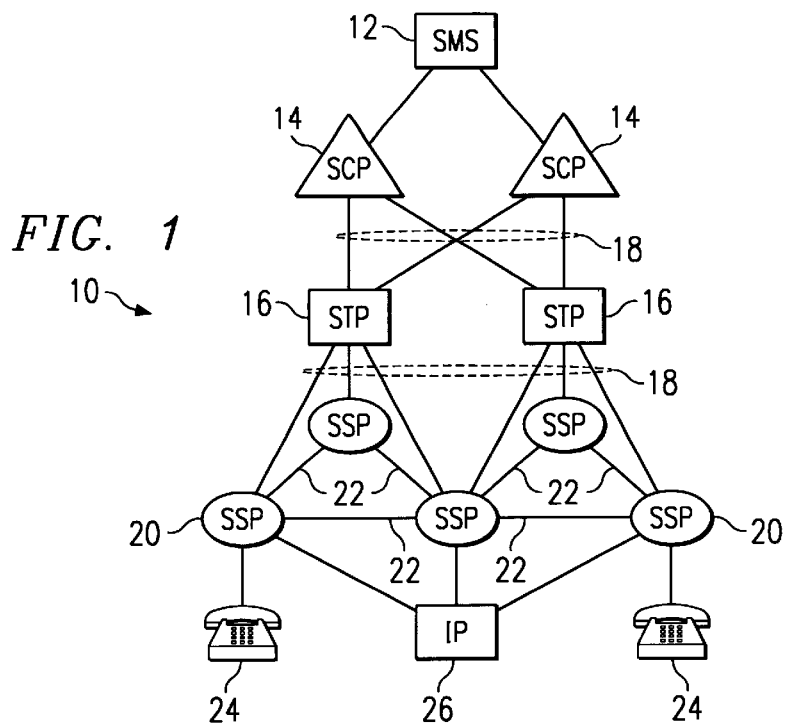
FIG. 1 is a block diagram illustrating an exemplary telecommunications network for use in connection with the present invention.

FIG. 1 is a block diagram illustrating an advanced intelligent network (AIN) 10 for use in connection with the present invention. The advanced intelligent network 10 includes a service management system (SMS) 12 that interfaces with a plurality of service control points (SCP) 14 and a plurality of signal transfer points (STP) 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7 (SS7) link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete the routing of a call. The service switching points 20 are part of a publicly-switched telephone network (PSTN) and are coupled to each other via trunks 22 and to telephone service subscribers, which include wire-based telephones, wireless telephones 24, and intelligent peripherals 26.

In operation, the service switching points 20 communicate with each other through messages routed by the signal transfer points 16 on the signaling system link set 18. The messages are used to set up, monitor, and break down connections between the service switching points 20. In routing messages between the service switching points 20, the signal transfer points 16 monitor the signaling system 18 for congestion. Upon detecting congestion on a link of the signaling system 18, a signal transfer point 16 notifies the service switching points 20 of the congestion. In response, the service switching points 20 reroute traffic or otherwise respond to the congestion to reduce traffic on the congested link. In this way, congestion is controlled in the signaling system 18.

In one embodiment, congestion control for the signaling system 18 is implemented in the service switching points 20 in accordance with Bellcore standard GR-317-CORE, entitled, "Switching System Generic Requirements for Call Control Using the Integrated Services Digital Network User Part (ISDNUP)," published by Bellcore of Piscataway, N.J. and ANSI Standard T1.111.4, entitled, "Signaling System No. 7 (SS7) Message Transfer Part (MTP)," published by American National Standards Institute of New York, N.Y., each of which is incorporated herein by reference. In this embodiment, congestion on the signaling links is rated from level 0 through level 3, with level 0 being no congestion and level 3 being the highest congestion level. Depending on the priority of an associated call, messages are assigned a priority of 0 through 3, with 0 being the lowest priority and 3 being the highest priority. Messages are transmitted on links of the signaling system 18 based on the congestion state of the links and the priority of the message. If a message cannot be transmitted by a signal transfer point 16 due to congestion of a signaling link, the signal transfer point 16 transmits a transfer control message (TFC) to the service switching point 20 that generated the message. The transfer control message informs the service switching point 20 that the link is in congestion or provides the congestion level. In response to the transfer control message, the service switching point 20 alters call processing based on the provided congestion level to reduce traffic on the congested link.

Figure 2:
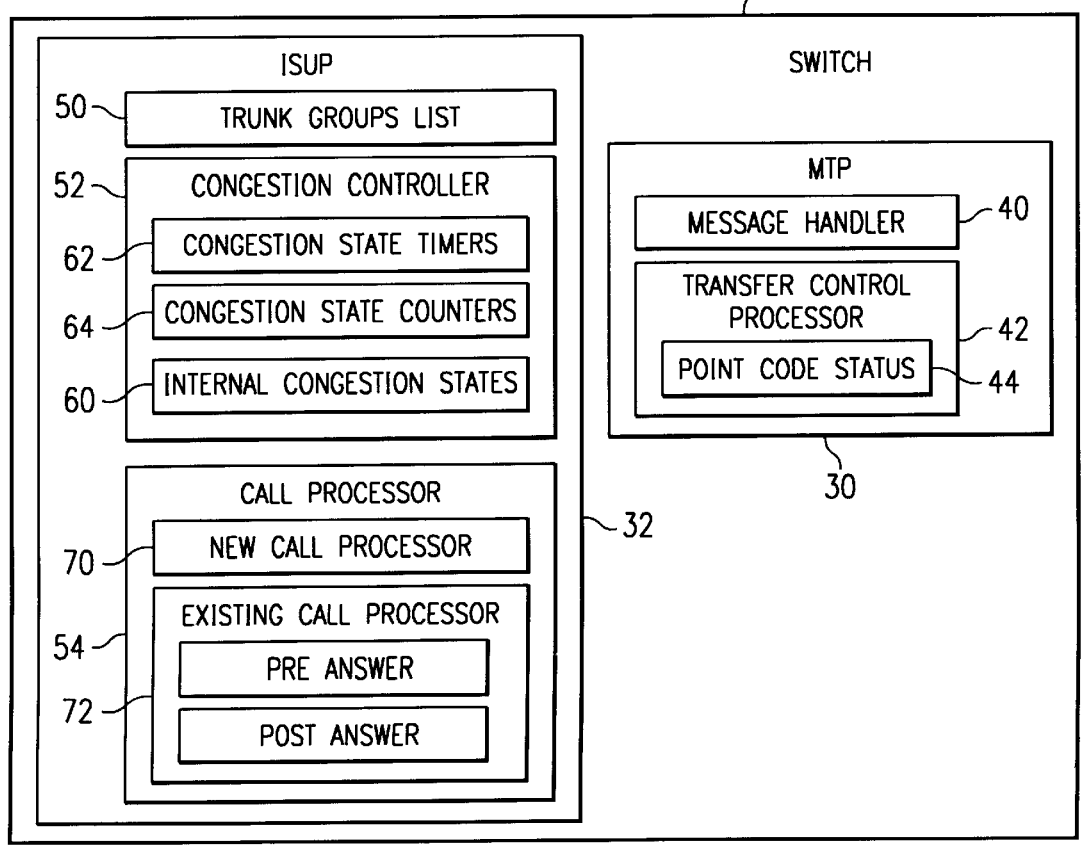
FIG. 2 is a block diagram illustrating details of a service switching point in the telecommunications network of FIG. 1.

FIG. 2 illustrates a service switching point 20 in accordance with one embodiment of the present invention. In this embodiment, the service switching point 20 includes a message transfer part (MTP) 30 and an integrated services user part (ISUP) 32 that implement congestion control in accordance with the previously described T1.111.4 and GR-317-CORE standards. The service switching point 20 may implement congestion control in accordance with other suitable standards or proprietary protocols in which the service switching point 20 receives and responds to congestion states of network elements. The service switching point 20 is a Tandem switch, such as the Megahub 600E manufactured by Alcatel USA, Inc., Class 5 switch, or other suitable switch or element that implements congestion in a telecommunications network. The telecommunications network may include voice, data or a combination of voice and data links.

Referring to FIG. 2, the message transfer part 30 includes a message handler 40 and a transfer control processor 42. The message handler 40 packages messages generated by the integrated services user part 32 into data packets for transmission to and routing by the signal transfer point 16 on the signaling system 18. In packaging a message, the message handler 40 adds header and other addressing information to enable the signal transfer point 16 to route the message. The message handler 40 also extracts messages from data packets received from the signal transfer point 16 and passes the messages to the integrated services user part 32. For transfer control messages, the message handler 40 passes the included congestion level to the transfer control processor 42.

The transfer control processor 42 includes a point code status 44 for each element in the network 10. As used herein, each means each of at least a subset of the identified items. The transfer control processor 42 continuously updates the point code status 44 for each element based on congestion levels received for the element. Thus, the point code status 44 stored by the transfer control processor 42 for an element is the latest congestion level received by the switch 20 for that element.

The integrated services user part 32 includes a list of trunk groups 50, a congestion controller 52, and a call processor 54. The list of trunk groups 50 includes a listing of all network elements associated with the switch 20. A network element is associated with the switch 20 when it is used in connection with communications transmitted or received by the switch 20. As described in more detail below, the congestion controller 52 accesses the list of trunk groups 50 to determine if a network element for which a congestion state has been received is associated with the switch 20 such that the switch 20 needs to implement congestion control.

The congestion controller 52 includes a set of internal congestion states 60, a set of congestion state timers 62, and a set of congestion state counters 64. The set of internal congestion states 60 includes an internal congestion state for each network element associated with the switch 20. The internal congestion states 60 correspond to the point code status 44, and thus the congestion levels of the network elements. The sets of congestion state timers and counters 62 and 64 include timers and counters used by the congestion controller 52 in connection with the internal congestion states 60. As described in more detail below, the congestion controller 52 sets an internal congestion state 60 for a network element based on the point code status 44 for the element, but uses a congestion state timer 62 to maintain the internal congestion state 60 for a predefined period of time independently of disparate congestion states received for the network element. The congestion controller 52 uses the congestion state counters 64 to limit the total amount of time in which the internal congestion state may remain at a level before congestion validation is performed to ensure that the network element is still experiencing congestion.

In one embodiment, the congestion state timers may include a separate timer for one or more congestion levels. Accordingly, the congestion levels may be maintained for disparate periods of time. In a particular embodiment described in more detail below in connection with FIG. 3, the set of congestion state timers 62 includes a level 1 timer for maintaining a level 1 congestion state for a first period of time and a high level timer for maintaining level 2 and 3 congestion states for a disparate period of time. In this embodiment, the set of congestion state counters 64 may include a level 1 counter for limiting the total period of time at which the internal congestion state is maintained at level 1 before congestion validation is performed and a high level counter for limiting the total period of time at which the internal congestion state is maintained at level 2 or 3 before congestion validation is performed. The timers and counters 62 and 64 are preferably completely customizable by the service provider deploying the switch 20. This allows congestion control to be independently optimized for each switch 20.

The call processor 54 includes a new call processor 70 and an existing call processor 72 to route calls during congestion. In accordance with the present invention, the call processor 54 relies on the internal congestion state 60 to implement call processing. Accordingly, the call processor 54 does not respond to congestion state hysteresis and changes in call processing based on changing congestion states is reduced. In the exemplary embodiment, the new and existing call processors 70 and 72 implement call processing in accordance with the Bellcore GR-317-CORE standard. In this embodiment, existing calls are differentiated depending on whether they are in a pre-answer state or post-answer state.

Figure 3:
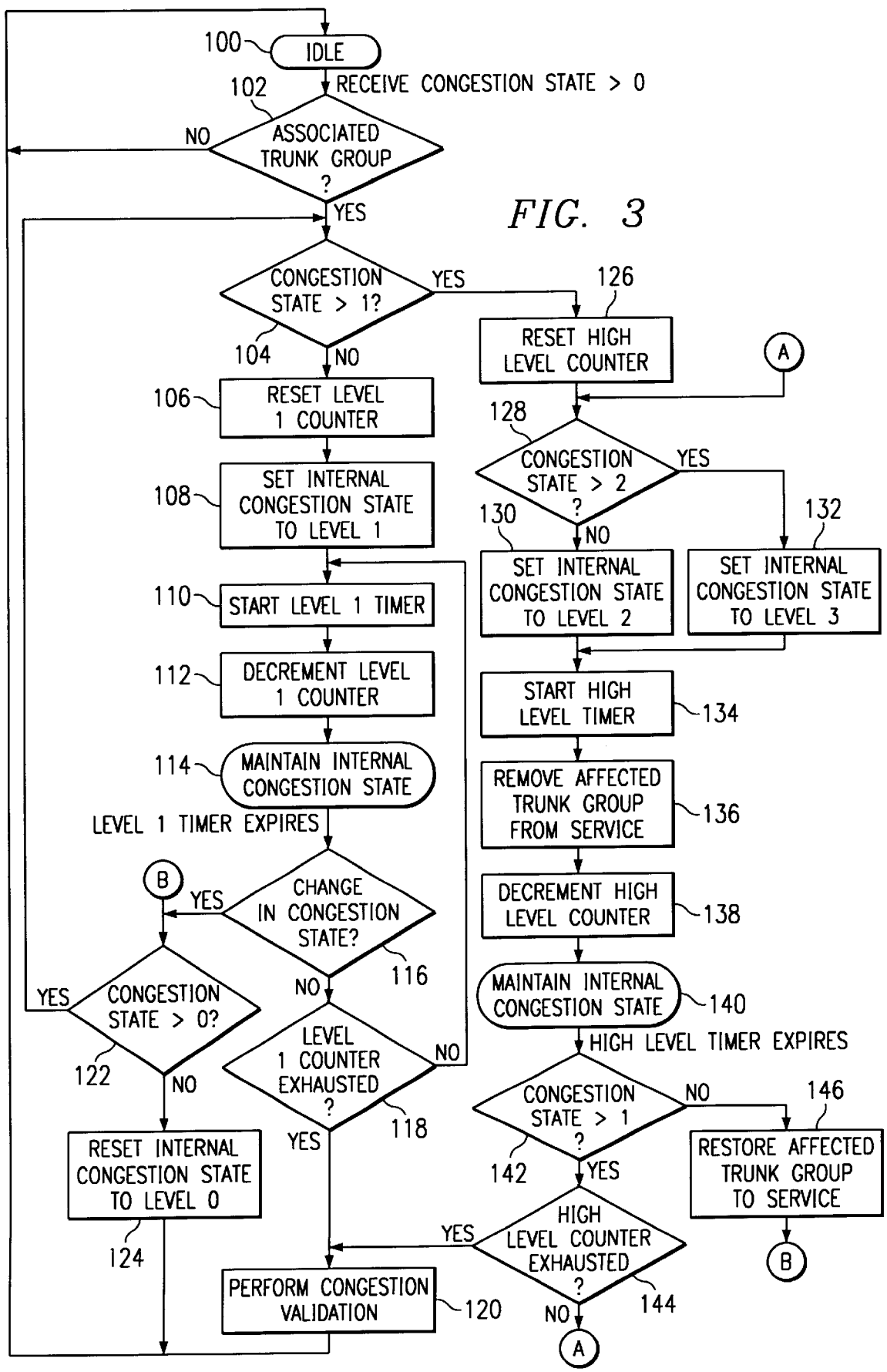
FIG. 3 is a flow diagram illustrating a computer method for congestion control within the service switching point of FIG. 2.

FIG. 3 is a flow diagram illustrating a computer method for congestion control in the switch 20 in accordance with one embodiment of the present invention. In this embodiment, congestion states are separately processed and maintained for each network element associated with the switch 20.

Referring to FIG. 3, the method begins at state 100 in which congestion controller 52 is at idle. In response to receiving the congestion state greater than 0 for a network element, state 100 transitions to decisional step 102. At decisional step 102, the congestion controller 52 determines if the network element for which the congestion state was received is associated with the switch 20. This is accomplished by determining if the network element is listed in the list of trunk groups 50. If the network element is not in the list of trunk groups 50, then it is not associated with the switch 20 and the No branch of decisional step 102 returns to state 100 in which the congestion controller 52 is idle. If the network element is in the trunk group list 50, then it is associated with the switch 20 and the Yes branch of decisional step 102 leads to decisional step 104.

At decisional step 104, the congestion controller 52 determines if the congestion state is greater than 1. This is determined using the point code status 44 which stores the congestion state. If the congestion state is not greater than 1, then the congestion state is equal to 1 and the No branch of decisional step 104 leads to step 106.

At step 106, the level 1 counter is reset. As described in more detail below, the counter is used to determine whether the network element has been maintained in the congestion state for an extended period of time such that congestion validation needs to be performed. Proceeding to step 108, the internal congestion state 60 is set to level 1. At step 110, the congestion controller 52 starts the level 1 timer 62. Next, at step 112, the level 1 counter is decremented to signify that the network element has been in the level 1 congestion state for one cycle.

Proceeding to state 114, the congestion controller 52 maintains the internal congestion state for the duration of the level 1 timer. Upon expiration of the level 1 timer, state 114 transitions to decisional step 116.

At decisional step 116, the congestion controller 52 determines if there has been a change in the congestion state for the network element. This is determined by comparing the point code status 44 for the network element to the internal congestion state 60 for the network element. If they are the same, then there has been no change in the congestion state and the No branch of decisional step 116 leads to decisional step 118.

At decisional step 118, the congestion controller 52 determines if the level 1 counter is exhausted. The level 1 counter is exhausted if it has been decremented to a predefined value, such as 0. If the level 1 counter is not exhausted, the No branch of decisional step 118 returns to step 110 where the level 1 timer is again started to maintain the internal congestion state at level 1 for the predefined period of time. The level 1 counter is decremented during each cycle and upon becoming exhausted, the Yes branch of decisional step 118 leads to step 120.

At step 120, the congestion controller 52 performs a congestion validation and then returns to the idle state 100. The congestion validation prevents the congestion level for an element from being erroneously maintained in a congestion state.

Returning to decisional step 116, if there has been a change in the congestion state, the Yes branch of decisional step 116 leads to decisional step 122. At decisional step 122, the congestion controller 52 determines if the congestion state is greater than 0. As previously described, the congestion state is stored by the point code status 44. If the congestion state is not greater than 0, then the congestion state is equal 0 and congestion no longer exists for the network element. Accordingly, the No branch of decisional step 122 leads to step 124 in which the internal congestion state is reset to level 0. Step 124 returns the congestion controller 52 to the idle state 100.

Returning to decisional step 122, if the congestion state is greater than 0, then congestion still exists for the network element and the Yes branch of decisional step 122 returns to decisional step 104 in which it is determined if the congestion state is greater than 1. If the congestion state is greater than 1, the Yes branch of decisional step 104 leads to step 126 in which the high level counter is reset. As previously described in connection with the level 1 counter, the high level counter is used to limit the number of consecutive cycles in which the congestion state may be maintained at a high level.

Next, at decisional step 128, the congestion controller 52 determines if the congestion state is greater than 2. If the congestion state is not greater than 2, then it is 2 and the No branch of decisional step 128 leads to step 130 in which the internal congestion state 60 is set to level 2. If the congestion state is greater than 2, then it is 3 and the Yes branch of decisional step 128 leads to step 132 in which the internal congestion state 60 is set to level 3.

Steps 130 and 132 each lead to step 134 in which the high level timer is started. Next, at step 136, the affected trunk group or network element is removed from service. Accordingly, when a network element is at a high congestion state, it is not used to further process new calls.

Proceeding to step 138, the high level counter is decremented to indicate that the internal congestion state 60 has been in a high level state for one cycle. Step 138 leads to state 140 in which the internal congestion state is maintained at the high level for the duration of the high level timer. Upon expiration of the high level timer, state 140 transitions to decisional step 142.

At decisional step 142, the congestion controller 52 determines if the congestion state for the element is greater than 1. This is determined from the point code status 44 for the element. If the congestion state remains greater than 1, the Yes branch of decisional step 142 leads to decisional step 144 in which the congestion controller 52 determines if the high level counter is exhausted. The high level counter is exhausted if is has reached a predefined minimum limit, such as 0. If the high level counter is not exhausted, the No branch of decisional step 144 returns to decisional step 128 in which it is determined if the congestion state is at level 2 or 3 and internal congestion state is thereafter set accordingly. If the high level counter is exhausted, the Yes branch of decisional step 144 leads to step 120. As previously described in connection with level 1 congestion, the congestion and controller 52 performs a congestion validation at step 120 and then returns to the idle state 100.

Returning to decisional step 142, if the congestion state is not greater than 1 upon expiration of the high level timer, the No branch of decisional step 142 leads to step 146. At step 146, the affected trunk groups are restored to service. Step 146 leads to decisional step 122 in which it is determined if the congestion state is greater than 0. As previously described, if the congestion state is greater than 0, the Yes branch of decisional step 122 returns to decisional step 104 in which the congestion state is determined. If the congestion state is not greater than 0, then congestion no longer exists for the network element and the internal congestion state is reset to level 0 at step 124. The congestion controller 52 then returns to the idle state 100. This way, congestion states for network elements are held for set periods of time in order to reduce the congestion state hysteresis and resulting call processing confusion.

Although the present invention has been described with several embodiments, various changes and modifications may be suggested to one skilled in the art. It is intended that the present invention encompass such changes and modifications as followed in the scope of the appended claims.

What is claimed is:

1. A method for congestion control in a first telecommunications element, comprising:

receiving a congestion state for a second telecommunications element coupled to the first telecommunications element;

setting an internal congestion state in the first telecommunications element for the second telecommunications element based on the congestion state;

the congestion state and the internal congestion state including a plurality of corresponding levels and the first telecommunications element includes a plurality of disparate congestion state timers corresponding to the levels, the act of independently maintaining the internal congestion state comprising:

setting a congestion state timer corresponding to the level of the internal congestion state; and maintaining the internal congestion state during the duration of the congestion state timer; and maintaining the internal congestion state for the second telecommunications element independently of receiving a disparate congestion state for the second telecommunications element in the first telecommunications element; and upon expiration of the timer, resetting the internal congestion state for the second telecommunications element based on a last congestion state received by the first telecommunications element for the second telecommunications element.

2. The method of claim 1, wherein the internal congestion state is maintained independently of the disparate congestion state by maintaining the internal congestion state for a predefined period of time.

3. The method of claim 1, wherein the first telecommunications element is a switch and the second telecommunications element is a link disposed between the switch and a second switch in communication with the switch.

4. The method of claim 1, further comprising implementing congestion control in the first telecommunications element for communications associated with the second telecommunications element based on the internal congestion state.

5. The method of claim 4, wherein congestion control is implemented in the first telecommunications element in accordance with the GR-317-CORE standard.

6. The method of claim 5, further comprising performing congestion validation in the first telecommunications element in response to the timer expiring a predefined number of times without a change in the congestion state for the second telecommunications element.

7. The method of claim 1, further comprising, upon expiration of the congestion state timer, resetting the internal congestion state for the second telecommunications element based on a last congestion state received by the first telecommunications element for the second telecommunications element.

8. A method for congestion control in a telecommunications network having a first switch and a second switch interconnected by a link, comprising:

detecting a congestion state for the link for communications from the first switch to the second switch;

transmitting the congestion state for the link to the first switch;

setting an internal congestion state in the first switch for the link based on the congestion state;

the congestion state and the internal congestion state including a plurality of corresponding levels and the switch includes a plurality of disparate congestion state timers corresponding to he levels, the act of independently maintaining the internal congestion state comprising:

setting a congestion state timer corresponding to the level of the internal congestion state; and maintaining the internal congestion state during the duration of the congestion state timer;

maintaining the internal congestion state for the link in the first switch independently of receiving a disparate congestion state for the link for communications between the first switch and the second switch; and upon expiration of the timer, resetting the internal congestion state for the link a based on a last congestion state received by the switch for the link.

9. The method of claim 8, wherein the internal congestion state is maintained independently of the disparate congestion state by maintaining the internal congestion state for a predefined period of time.

10. The method of claim 8, further comprising implement congestion control in the first switch for communications associated with the second switch based on the internal congestion state.

11. The method of claim 10, wherein congestion control is implemented in the first switch in accordance with the GR-317-CORE standard.

12. The method of claim 8, the act of independently maintaining the internal congestion state comprising:

setting a congestion state timer; and maintaining the internal congestion state during the duration of the congestion state timer.

13. The met hod of claim 12, further comprising, upon expiration of the congestion state timer, resetting the internal congestion state for the link based on a last congestion state received by the switch for the link.

14. The method of claim 12, further comprising performing congestion validation in the switch in response to the timer expiring a predefined number of times without a change in the congestion state for the link.

* * * * *